(12) United States Patent
Proett et al.

(10) Patent No.: US 6,932,167 B2
(45) Date of Patent: Aug. 23, 2005

(54) FORMATION TESTING WHILE DRILLING DATA COMPRESSION

(75) Inventors: Mark A. Proett, Missouri City, TX (US); Preston N. Weintraub, The Woodlands, TX (US); Christopher A. Golla, Kingwood, TX (US); Svetozar D. Simeonov, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 99 days.

(21) Appl. No.: 10/440,952

(22) Filed: May 19, 2003

(65) Prior Publication Data

US 2003/0214879 A1 Nov. 20, 2003

Related U.S. Application Data

(60) Provisional application No. 60/381,347, filed on May 17, 2002.

(51) Int. Cl.[7] .............................................. E21B 47/00
(52) U.S. Cl. ............................................ 175/50; 702/7
(58) Field of Search .................... 702/7, 12; 166/252.5, 166/264; 367/36; 175/45, 50

(56) References Cited

U.S. PATENT DOCUMENTS

| | | | | |
|---|---|---|---|---|
| 1,240,328 A | * | 9/1917 | Fressenden .................. | 367/36 |
| 3,949,354 A | | 4/1976 | Claycomb .................... | 367/84 |
| 3,958,217 A | | 5/1976 | Spinnler ....................... | 367/83 |
| 4,216,536 A | | 8/1980 | More ........................... | 367/83 |
| 4,401,134 A | | 8/1983 | Dailey .................... | 137/624.11 |
| 4,515,225 A | | 5/1985 | Dailey ......................... | 175/40 |
| 4,803,873 A | | 2/1989 | Ehlig-Economides .... | 73/152.31 |
| 4,893,505 A | | 1/1990 | Marsden et al. ......... | 73/152.24 |
| 5,031,155 A | | 7/1991 | Hsu ............................. | 367/25 |
| 5,113,379 A | | 5/1992 | Scherbatskoy ............... | 367/25 |
| 5,233,866 A | | 8/1993 | Desbrandes .............. | 73/152.05 |
| 5,602,334 A | | 2/1997 | Proett et al. ............. | 73/152.24 |
| 5,684,693 A | | 11/1997 | Li ................................ | 702/6 |
| 5,703,286 A | | 12/1997 | Proett et al. ............. | 73/152.24 |
| 6,229,453 B1 | | 5/2001 | Gardner et al. .......... | 340/853.8 |
| 6,405,136 B1 | | 6/2002 | Li et al. ....................... | 702/22 |
| 6,473,696 B1 | | 10/2002 | Onyia et al. ................... | 702/6 |
| 6,568,487 B2 | | 5/2003 | Meister et al. ................ | 175/50 |
| 6,672,386 B2 | * | 1/2004 | Krueger et al. .......... | 166/252.5 |
| 6,714,872 B2 | * | 3/2004 | DiFoggio et al. ............. | 702/12 |

OTHER PUBLICATIONS

M. Proett et al.; "Formation Testing While Drilling—FTWD Answer Product Specification"; Halliburton; Houston Technology Center; Ver. 1.1 (Draft); 73 pp.; Oct. 29, 2001.

* cited by examiner

Primary Examiner—John Barlow
Assistant Examiner—Victor J. Taylor
(74) Attorney, Agent, or Firm—Conley Rose, P.C.

(57) ABSTRACT

A compression scheme for reducing the amount of data that must be transmitted uplink from a formation test while drilling apparatus. Periodic samples are taken within the formation test apparatus and prior to transmitting data uplink, the samples are analyzed to generate curve fit parameters that define a curve that most closely fits the sampled data. A minimal set a data points, time variables, and curve fit parameters are transmitted to the surface where the transmitted data is used to reconstruct the formation pressure test curve. A quality of fit value is also transmitted with the minimal data set as an indication of the quality of the fit between the reconstructed data and the actually sampled data points.

53 Claims, 4 Drawing Sheets

FORMATION TESTING WHILE DRILLING DATA COMPRESSION

CROSS-REFERENCE TO RELATED APPLICATIONS

The present application claims the benefit of U.S. Provisional Application Ser. No. 60/381,347, filed May 17, 2002, entitled Formation Testing While Drilling Data Compression, which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to methods and apparatus for using a formation tester to retrieve formation characteristics on a subterranean formation through a wellbore by acquiring pressure versus time response data in order to calculate formation pressure, permeability, and other formation characteristics. More particularly, the present invention relates to a method of acquiring said data from a formation tester disposed in a drill string configured to perform formation testing while drilling operations. More particularly still, the present invention relates to a method of compressing the amount of data transmitted to the surface during a formation testing while drilling operation to decrease the amount of time required to transmit the formation characteristic data.

2. Background of the Invention

In drilling and producing hydrocarbon wells, optimizing the performance of wells is essential. The acquisition of accurate data from the wellbore is critical to the optimization of the completion, production and/or rework of hydrocarbon wells. This wellbore data can be used to determine the location and quality of hydrocarbon reserves, whether the reserves can be produced through the wellbore, and for well control during drilling operations.

Well logging is a means of gathering data from subsurface formations by suspending measuring instruments within a wellbore and raising or lowering the instruments while measurements are made along the length of the wellbore. For example, data may be collected by lowering a measuring instrument into the wellbore using wireline logging, logging-while-drilling (LWD), or measurement-while-drilling (MWD) equipment. In wireline logging operations, the drill string is removed from the wellbore and measurement tools are lowered into the wellbore using a heavy cable that includes wires for providing power and control from the surface. In LWD and MWD operations, the measurement tools are integrated into the drill string and are ordinarily powered by batteries and controlled by either on-board and/or remote control systems. Regardless of the type of logging equipment used, the measurement tools normally acquire data from multiple depths along the length of the well. This data is processed to provide an informational picture, or log, of the formation, which is then used to, among other things, determine the location and quality of hydrocarbon reserves. One such measurement tool used to evaluate subsurface formations is a formation tester.

To understand the mechanics of formation testing, it is important to first understand how hydrocarbons are stored in subterranean formations. Hydrocarbons are not typically located in large underground pools, but are instead found within very small holes, or pore spaces, within certain types of rock. The ability of a rock formation to allow hydrocarbons to move between the pores, and consequently into a wellbore, is known as permeability. The viscosity of the oil is also an important parameter, and the permeability divided by the viscosity is termed "mobility" ($k/\mu$). Similarly, the hydrocarbons contained within these formations are usually under pressure and it is important to determine the magnitude of that pressure in order to safely and efficiently produce the well.

During drilling operations, a wellbore is typically filled with a drilling fluid ("mud"), such as water, or a water-based or oil-based mud. The density of the drilling fluid can be increased by adding special solids that are suspended in the mud. Increasing the density of the drilling fluid increases the hydrostatic pressure that helps maintain the integrity of the wellbore and prevents unwanted formation fluids from entering the wellbore. The drilling fluid is continuously circulated during drilling operations. Over time, as some of the liquid portion of the mud flows into the formation, solids in the mud are deposited on the inner wall of the wellbore to form a mudcake.

The mudcake acts as a membrane between the wellbore, which is filled with drilling fluid, and the hydrocarbon formation. The mudcake also limits the migration of drilling fluids from the area of high hydrostatic pressure in the wellbore to the relatively low-pressure formation. Mudcakes typically range from about 0.25 to 0.5 inch thick, and polymeric mudcakes are often about 0.1 inch thick. On the formation side of the mudcake, the pressure gradually decreases to equalize with the pressure of the surrounding formation.

The structure and operation of a generic wireline formation tester are best explained by referring to FIG. 1. In a typical formation testing operation, a formation tester 500 is lowered on a wireline cable 501 to a desired depth within a wellbore 502. The wellbore 502 is filled with mud 504, and the wall of the wellbore 502 is coated with a mudcake 506. Because the inside of the tool is open to the well, hydrostatic pressure inside and outside the tool are equal. Once the formation tester 500 is at the desired depth, a probe 512 is extended to sealingly engage the wall of the wellbore 502 and the tester flow line 519 is isolated from the wellbore 502 by closing equalizer valve 514.

Formation tester 500 includes a flowline 519 in fluid communication with the formation and a pressure sensor 516 that can monitor the pressure of fluid in flowline 519 over time. From this pressure versus time data, the pressure and permeability of the formation can be determined. Techniques for determining the pressure and permeability of the formation from the pressure versus time data are discussed in U.S. Pat. No. 5,703,286, issued to Proett et al., and incorporated herein by reference for all purposes.

Whereas the above description is provided in the context of a wireline formation tester, the same concepts generally also apply to formation testing while drilling (FTWD) applications where the formation testing tool is disposed within a drill string. Given the costs of drilling downtime associated with removing a drill string and inserting a wireline tester into a borehole, it is clearly advantageous to perform testing and acquire formation characteristics while drilling. In the alternative, it is also desirable to acquire formation characteristic data during brief interruptions in drilling. In either case, with FTWD, the drill string does not have to be removed from a borehole and all data may be transmitted to the surface while the drill string remains in the borehole.

Unfortunately, FTWD tools disposed on drill strings do not generally include transmission paths for transmitting data to and receiving data from the surface. Communication links such as data cables, fiber optic cables, or RF transceivers are simply not present in conventional drill strings. However, there is still a need to transmit the results of a FTWD or LWD operation back to the surface. This problem is not new in the art. It has long been recognized in the oil and gas industry that communicating between the surface equipment and the subsurface drilling assembly is both desirable and necessary.

Uplink and downlink signaling, or communicating between surface equipment and a drilling assembly, is typically performed to provide instructions in the form of commands to the drilling assembly and for transmitting logging data to the surface. For example, in a directional drilling operation, downlink signals may instruct the drilling apparatus to alter the direction of the drill bit by a particular angle or to change the direction of the tool face. Uplink signaling, or communicating between the drilling assembly and the surface equipment, is typically performed to verify the downlink instructions and to communicate data measured downhole during drilling to provide valuable information to the drilling operator.

A common method of downlink signaling is through mud pulse telemetry. When drilling a well, fluid is pumped downhole such that a downhole receiver within the drilling assembly can measure the pressure and/or flowrate of that fluid. Mud pulse telemetry is a method of sending signals by creating a series of momentary pressure changes, or pulses, in the drilling fluid, which can be detected by a receiver. For downlink signaling, the pattern of pressure pulses, including the pulse duration, amplitude, and time between pulses, is detected by the downhole receiver and then interpreted as a particular instruction to the downhole assembly.

The use of mud pulse telemetry as a communication means is well known to those skilled in the art. Representative examples of mud pulse telemetry systems may be found in U.S. Pat. Nos. 3,949,354, 3,958,217, 4,216,536, 4,401,134, 4,515,225 and 5,113,379. An unfortunate limitation to mud pulse telemetry systems is that bandwidth is severely limited as compared to wireline data transmission systems. It is generally accepted by those skilled in the art that data transmission rates in mud pulse telemetry systems are on the order of about two bits per second.

The effects of this limitation may be understood by considering the representative formation test pressure timeline shown in FIG. 2, which shows a number of pressure samples taken at fixed time intervals during a formation pressure test. Specifically, the sampling scheme shown in FIG. 2 produces 50 discrete samples of the pressure curve, which includes transitions from a hydrostatic, pre-formation test condition to the point where the packer is set and the equalizer valve is closed, which, in the case of a proper seal, is characterized by an increased pressure. The formation test continues by pulling pressure in the formation tester down using a drawdown piston or some other equivalent pressure lowering means. Ideally, the drawdown cycle pulls pressure within the formation tester below the formation pressure to allow pressure within the formation tester to accurately rise to the formation pressure. Following the drawdown cycle, pressure within the formation tester is permitted to rise to the formation pressure without any inducement from external devices. That is, pressure rises naturally at a rate that is governed by the pressure gradient and by the mobility of the fluid in the formation. Ultimately, once the pressure in the formation tester converges on the formation pressure, a final pressure reading is taken before releasing the packer and pressure rises once again to the hydrostatic pressure that exists within the wellbore annulus.

In general, capturing the information in the pressure curve shown in FIG. 2 requires a sampling of pressure points at discrete times. These pressure samples are then subsequently converted to digital representations if the pressure sensor 516 is an analog device. The size of the digital words that represent each individual sample must be kept small enough and the time between samples must be kept far enough apart to allow the data to be transmitted real time. In general, these limitations are in contrast with the requirements for reconstructing a curve from digital samples. It is normally desirable to include samples with larger bit resolutions that are spaced close enough to each other to guarantee that all relevant pressure characteristics are transmitted uplink. Unfortunately, mud-pulse telemetry simply does not afford this luxury. With the two bit/second limitation, eight-bit word pressure samples may be transmitted no faster than every four seconds. In reality, bit resolutions must be even smaller and sample rates must be larger to account for packet headers and other transmission data. Consequently, the limitations imposed by mud-pulse telemetry impose significant restrictions on the quality of formation pressure data gathered during drilling operations.

The above generalizations have been described with the assumption that mud pumps are on, thereby implying that data can be transmitted real-time or near real-time using mud pulse telemetry. However, it may also be desirable to perform formation tests with all pumps off. Pump pulses may add noise to pressure measurements making it difficult to assess how accuracy of the measurements are affected. Thus, the quality of the pressure samples improves if external vibrations and pulses are temporarily terminated by turning all pumps off. If formation testing occurs with mud pumps off, the ability to communicate pressure data real-time ceases. Consequently, it becomes imperative that the relevant pressure data be transmitted immediately following a formation test, when the mud pumps are turned back on. Further, it is critical that said data be transmitted as quickly as possible.

Given the above problems associated with transmitting formation pressure data uplink from a wellbore to the surface, it would be desirable to transmit a compressed version of the pressure data that permits reconstruction of the relevant pressure curves. To achieve this, it would be advantageous to provide only critical pressure and timing information sufficient to relay formation characteristics. In addition, given the unreliable nature of most compression techniques, it would also be desirable to provide some indication of how accurately the compressed information matches the actual data samples taken downhole.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, one skilled in the art may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". In addition, reference to up or down will be made for purposes of description with "up," "upward," or "upper" meaning toward the surface of the well and "down," "downward," or "lower" meaning toward the bottom of the primary wellbore or any lateral borehole. Furthermore, the term "couple" or "couples" is intended to mean either an indirect or a direct connection. Thus, if a first device couples to a second device, that connection may be through a direct connection, or through an indirect electrical connection via other devices and connections.

This exemplary disclosure is provided with the understanding that it is to be considered an exemplification of the principles of the invention, and is not intended to limit the invention to that illustrated and described herein. In particular, various embodiments of the present invention provide a number of different constructions and methods of operation. It is to be fully recognized that the different teachings of the embodiments discussed below may be employed separately or in any suitable combination to produce desired results.

DETAILED DESCRIPTION OF THE PREFERRED EMBODIMENTS

The preferred embodiment described herein generally discloses compression scheme for generating a limited number of data points, curve parameters, and curve fit parameters that fully define a formation test pressure curve. The data points and all parameters may be transmitted from a downhole communications unit to a surface receiver where the data points and all parameters may be used to reconstruct a representation of the original formation test pressure curve. The preferred embodiment thus presents a means of reducing the amount of data that must be transmitted uplink using mud pulse or other telemetry and yet still provide relevant formation test results. The full scope of the preferred embodiment is described below in conjunction with related FIGS. 3–6.

Figure 3:
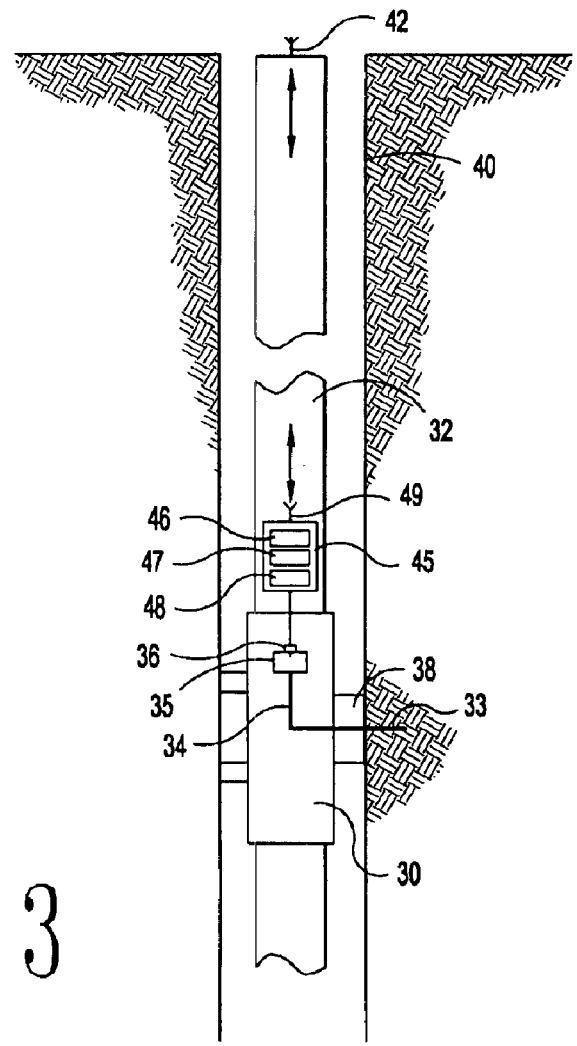
FIG. 3 shows a schematic representation of a formation test while drilling (FTWD) tool in a downhole configuration adapted to transmit compressed formation pressure test curve data in accordance with the preferred embodiment.

The preferred embodiment is implemented in conjunction with a formation test while drilling (FTWD) apparatus 30 of the type shown in FIG. 3. The FTWD apparatus 30 is preferably disposed along a drill string 32, which may be comprised of segmented portions or may be embodied as a continuous length of coiled tubing. The FTWD apparatus 30 includes any relevant mechanical, hydraulic, and electrical components that may be found in an equivalent wireline formation tester. For clarity, only the formation pressure probe 33, flowline 34, and a drawdown fluid chamber 35 are shown in the FTWD apparatus 30 of FIG. 3. During normal applications, a formation test is initiated by engaging a packer pad or pads 38 against the wall of the wellbore 40. Then, a pretest or drawdown piston (not specifically shown) retracts to draw formation fluid from the probe 33 into the flowline 34 at a rate that is faster than the rate at which formation can flow out of the formation. This drawdown process creates an initial pressure drop within the flowline 34 and chamber 35. After the drawdown cycle, pressure in the flowline 34 and chamber 35 gradually increases until the pressure equalizes with the formation pressure. The formation pressure and pressure values that appear during initial packer set, drawdown, and buildup, as well as before and after the formation test are all measured with a pressure transducer 36 that is mounted in chamber 35 or in a position that permits detection of pressures in flowline 34 or chamber 35.

The pressure transducer 36 is preferably configured to transmit real-time pressure values to a control module 45 that may be included in the FTWD apparatus 30 or within a separate apparatus disposed within the same drill string 32. In accordance with the preferred embodiment, the control module 45 preferably comprises a processor 46, memory 47, and storage devices 48, which may simply be embodied as extended memory devices. Control module 45 also preferably interfaces with transmitter device 49 and receiver device 60 for issuing or receiving commands, data, and instructions in accordance with a standard mud pulse telemetry communications scheme or some other telemetry means. Thus, control module 45 is responsible for initiating or responding to all communications with the surface. Accordingly, a compatible transmitter 42 and receiver 61 are necessarily required at the surface as well.

In addition, the control module 45 also stores instructions (in memory 47) in the form of a script language or other software code that allows processor 46 to perform the compression of all pressure readings transmitted from transducer 36. The control module 45 preferably stores the data samples in storage 48 until the formation test is complete or until a sufficient number of samples have been acquired, at which point the processor analyzes the pressure samples and performs a curve fit analysis to the samples. In an alternative configuration, the control module 45 may process pressure sample data in pseudo-real time to transmit compressed data values to the surface as they are generated. A more detailed description of the curve fit analysis and parameters is provided below.

Figure 2:
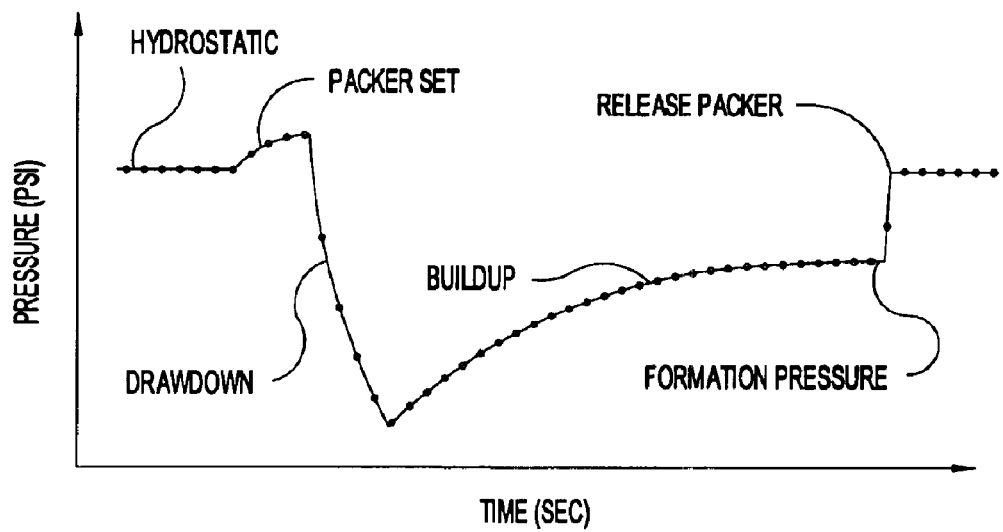
FIG. 2 shows a typical formation pressure test curve and related events.
Figure 4A:
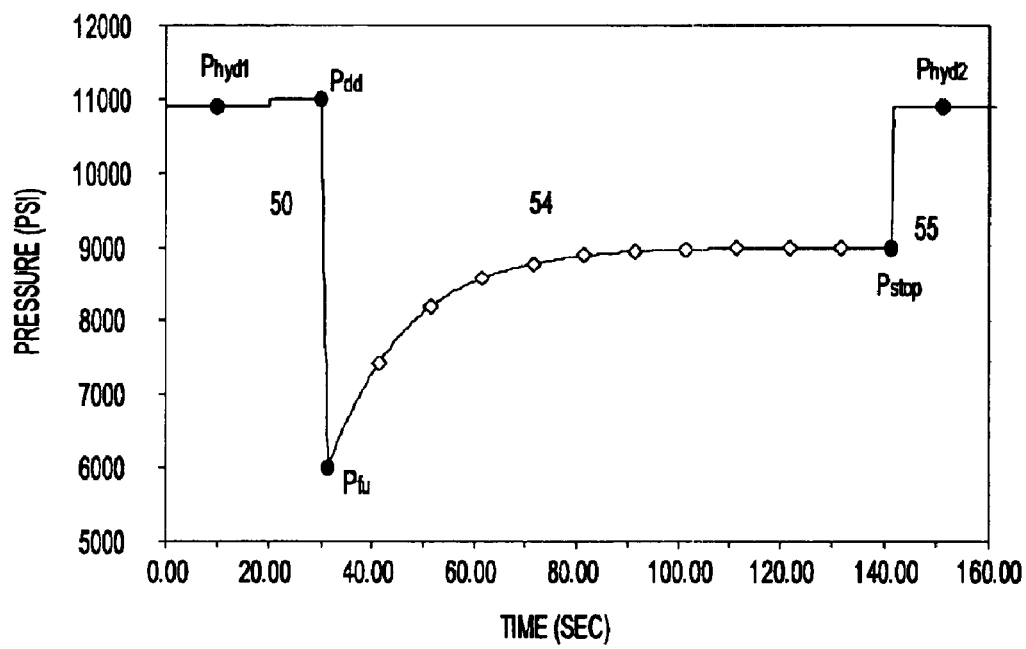
FIGS. 4A and 4B show representative formation pressure test curves reflecting different formation characteristics.
Figure 4B:
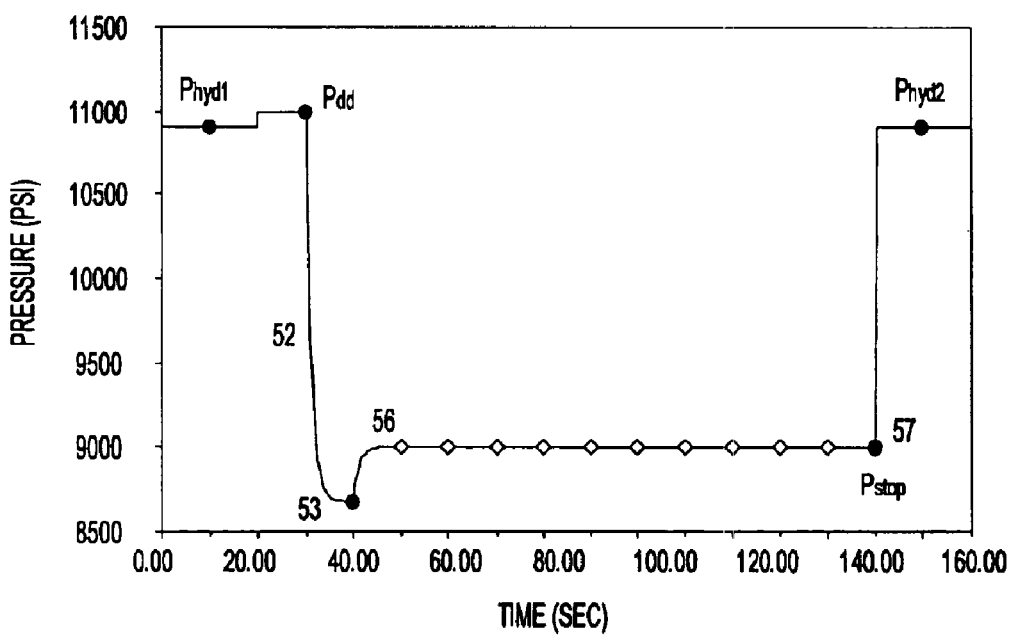

Turning now to FIGS. 4A and 4B, two representative formation pressure test curves are shown. The curves resemble, but do not exactly match the representative curve shown in FIG. 2. There are two predominant reasons for the difference. First, the formation tests performed in each of the two curves were conducted with different formation fluid characteristics. Second, the curves represent the reconstruction of a formation test pressure curve using the compressed data points and curve fit parameters in accordance with the preferred embodiment. In any event, it is still readily discernible from the curves in FIGS. 4A and 4B that formation fluid and pressure characteristics have a marked effect on the shape and values exhibited by the test curves.

For instance, in FIG. 4A, the formation test was performed with a fluid mobility that is roughly two orders of magnitude lower than the fluid mobility in FIG. 4B. More mobile fluids generally tend to flow more readily and, consequently, pressures tend to stabilize more quickly for a more mobile fluid. In other words, more mobile fluids react to transients more readily than do less mobile fluids. This characteristic is apparent in the drawdown curves 50, 52 as well as the buildup curves 54, 56 in FIGS. 4A and 4B.

In FIG. 4A, which represents a formation test on a less mobile fluid, the drawdown cycle 50 is characterized by a more gradual slope downward to the point at which the buildup curve begins. In this particular drawdown, it is not likely that the drawdown piston within the FTWD apparatus 30 ever bottomed out because of the resistance induced by the formation fluid. Contrast this curve 50 with that shown in FIG. 4B, curve 52, which represents a formation test on a more mobile fluid. In drawdown curve 52, the chamber pressure reaches a definite limit in the 8700 psi range. The flat portion 53 in curve 52 represents a situation where the drawdown piston bottoms out and pressure remains flat until enough formation fluid enters the flowline 34 and chamber 35 so as to cause the pressure to increase.

The same transient characteristics may also be seen in the buildup curves 54, 56 of FIGS. 4A and 4B. In FIG. 4A, the formation pressure 55 is reached after a much longer period of time than that shown in FIG. 4B. Again, this reflects the ability of the formation fluid to react to the pressure transient created within the FTWD apparatus 30.

Given that different formation test curve shapes may be expected with different formation characteristics, it is possible to develop curve fit parameters that permit reconstruction of the formation test curves and, consequently, represent formation fluid characteristics. If one assumes that the drawdown and buildup curves may be represented by logarithmic functions, then the curves may be expressed in terms of the general equation $$P = P_f - \beta \cdot e^{-\frac{t}{\alpha}}$$

where P represents the change in pressure over time, $P_f$ represents the initial formation pressure, $\beta$ represents a transient constant, expressed in the same units as P (p.s.i.) and $\alpha$ represents a time constant expressed in seconds. Once these curve fit parameters $\alpha$, $\beta$ and $P_f$ are generated, the simulated curve generated by these parameters may be compared with actual pressure samples to determine if the curve fit parameters accurately reflect actual pressure measurements. These curves are shown with appropriate labels in FIG. 5.

Figure 5:
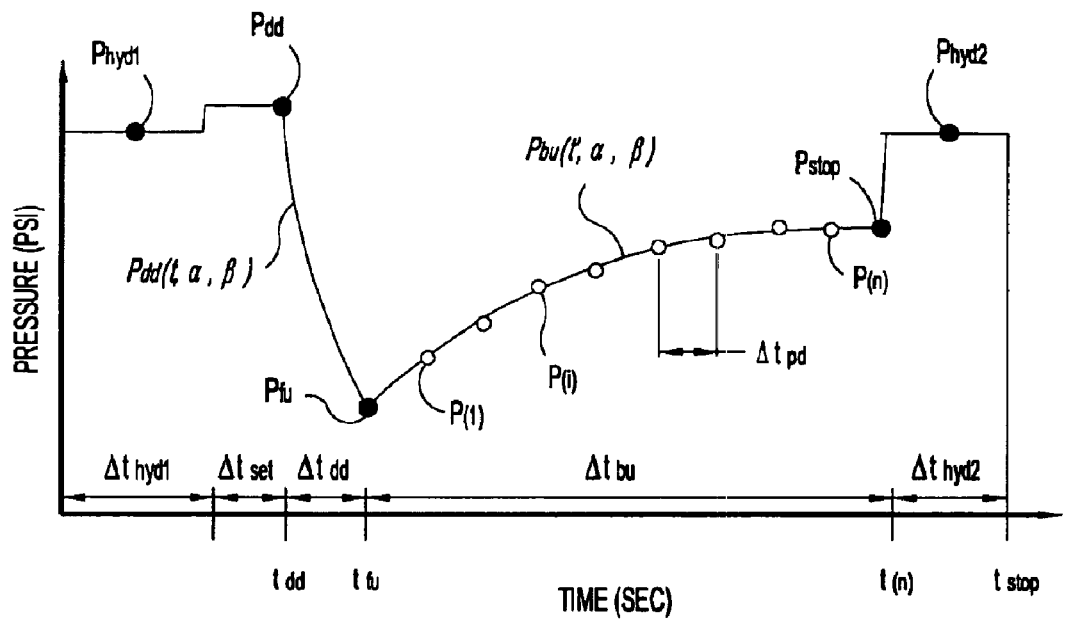
FIG. 5 shows a formation pressure test curve reflecting the time and curve fit parameter dependence for the time varying portions of the curve.

As FIG. 5 shows, the drawdown pressure curve $P_{dd}$ is a function of time t and curve fit parameters $\alpha$, $\beta$ and $P_f$. Similarly, buildup pressure curve $P_{bu}$ is a function of the same curve fit parameters $\alpha$, $\beta$ and $P_f$, but also of time t', which differs from time t by the value $\Delta t_{dd}$, which represents the time elapsed between the beginning $t_{dd}$ and end $t_{fu}$ of the drawdown cycle. The final buildup pressure $P_{stop}$ approaches the initial formation pressure $P_f$ asymptotically. The curve fit parameters $\alpha$, $\beta$ and $P_f$ are generated by finding the parameters that most closely match the sampled pressure values, represented in FIG. 5 as $P_{(i)}$. Parameters $\alpha$ and $\beta$ may be generated using one or both of the equations $P_{dd}$ or $P_{bu}$. If one equation is used, it is preferred that equation $P_{bu}$ be used. If both equations are used, the parameters $\alpha$ and $\beta$ will be substantially the same such that either pair of values may be used, or some average or correlation of the two pair of values may be used.

Once $\alpha$, $\beta$ and $P_f$ are generated, the approximated solutions to $P_{dd}$ and $P_{bu}$ may then be compared to the actual pressure samples to generate some measure of the correlation. In the preferred embodiment, a Chi-squared ($X^2$) value is generated and transmitted as a measure of this correlation. Calculation of this $X^2$ value is discussed below and provided in Appendix C. It should be noted that this particular error function is chosen because the result is bounded and provides a quantitative value for the quality of the resultant curve fit generated by the control module 45. It is entirely feasible that other error functions known to those in the art can just as easily be applied to the present curve fit analysis.

Thus, it is a prime objective of the preferred embodiment to estimate the quality of the formation pressure test as quickly as possible to allow drilling operators to determine if a pressure test is valid and to make adjustments and drilling decisions real time or as quickly as possible following a FTWD test.

Figure 1:
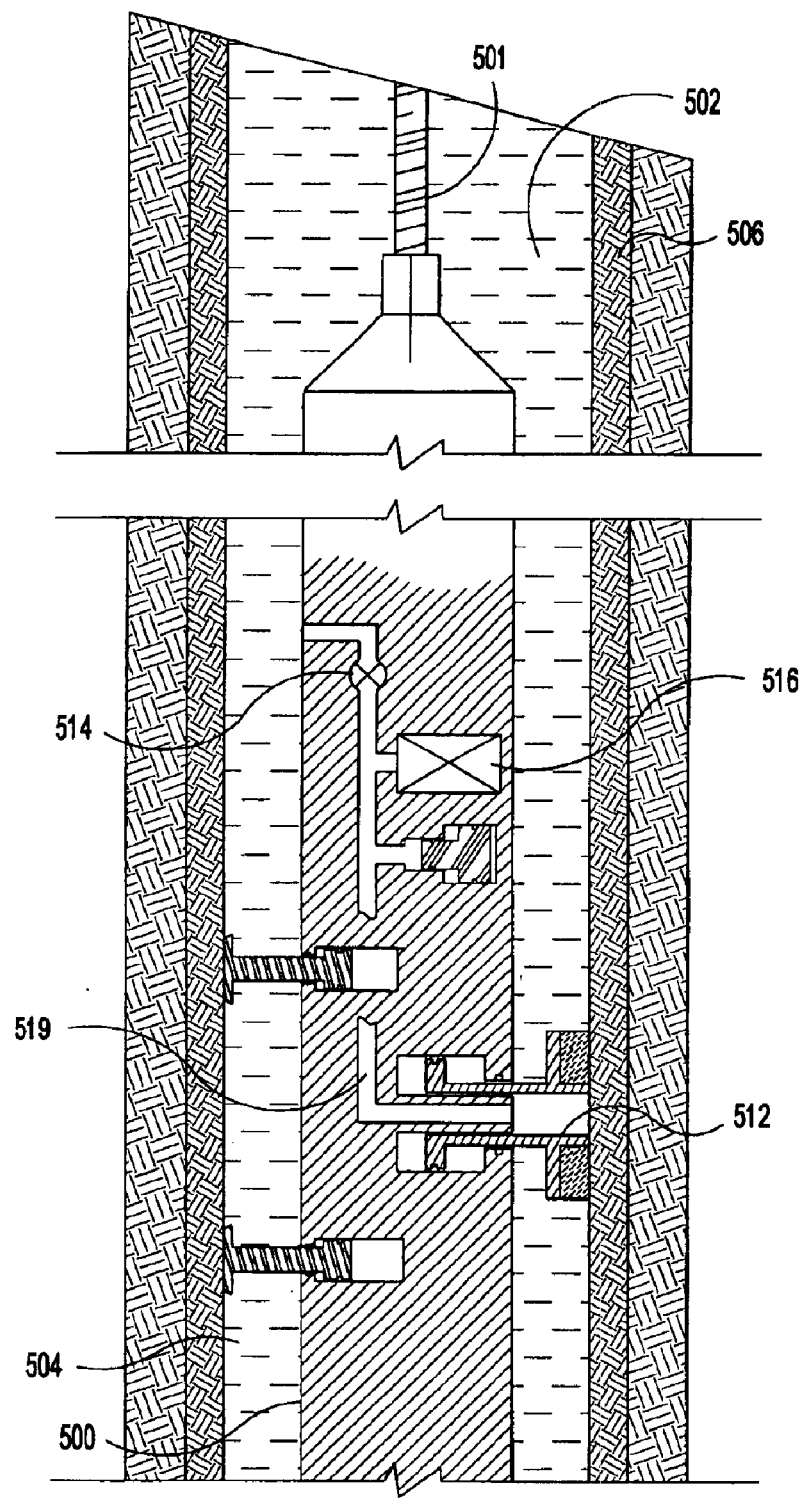
FIG. 1 shows a typical representation of a wireline formation tester.

In the preferred embodiment, the information transmitted from the control module 45 to the surface include a limited number of actual data points, the curve fit parameters $\alpha$, $\beta$ and $P_f$, and the $X^2$ correlation figure. It is envisioned that at least five specific data points shown in FIGS. 4A and 4B should be transmitted as part of the preferred solution. These points include: $P_{hyd1}$, $P_{dd}$, $P_{fu}$, $P_{stop}$, and $P_{hyd2}$. $P_{hyd1}$ represents the hydrostatic pressure sampled in the FTWD apparatus 30 prior to extension of the packer 38 and closing of the equalizer valve, such as the equalizer valve 514 found in the wireline formation tester of FIG. 1. $P_{dd}$ represents a pressure sampled following the packer 38 extension and set. In general, a nominal increase in detected pressure between $P_{hyd1}$ and $P_{dd}$ should be indicated, as this will mean that a successful seal between the packer 38 and the wellbore 40 has been created. $P_{fu}$ represents the pressure within the FTWD apparatus 30 following the drawdown cycle and before pressure begins to increase to the formation pressure. $P_{stop}$ represents the final pressure measurement taken before the packer 38 is released and the equalizer valve is opened, thereby coupling the flowline 34 and fluid chamber 35 to hydrostatic and annulus pressures $P_{hyd2}$.

It should be noted that while these five data points are considered to be the minimum desirable data points to be transmitted with the curve fit parameters, it is certainly feasible that any subset of these points can be transmitted independent of the other points. Thus, for example, if the resultant formation pressure $P_{stop}$ is the only pressure of interest, it may be possible to send up this data point along with the $X^2$ curve fit correlation value as an indication of how close $P_{stop}$ is to the actual formation pressure $P_f$. Other combinations of data points and curve fit parameters may be transmitted uplink as desired. By the same token, it may also be desirable to transmit more than the five data points indicated above. These additional points are shown as P(i) in FIG. 5.

In a scenario where mud pumps are on or if some telemetry system other than mud pulse telemetry is available, it may be desirable to transmit these additional P(i) points as an aid in determining if the pressure within the FTWD apparatus 30 has sufficiently converged upon the formation pressure. As FIGS. 4A, 4B, and 5 show, pressure in the buildup curve $P_{bu}$ ideally flattens out at the formation pressure. Further, as the pressure curves in FIGS. 4A and 4B indicate, after a preset amount of time, a final pressure sample, $P_{stop}$, is preferably transmitted as the formation pressure. However, it may be possible for the control module 45 to determine whether the pressure samples have sufficiently converged on the formation pressure. For example, if subsequent samples do not differ by some predetermined threshold, perhaps say 1 psi or some percentage, then the control module 45 may terminate the formation test and transmit all relevant data points, curve fit parameters, and the data points leading up to the final formation pressure sample P(n). Thus, a drilling operator may use the data samples and curve fit parameters to judge whether successful results were achieved.

This early termination may be executed by the control module regardless of whether the pumps are on during the formation test. However, the pumps-on scenario provides some additional advantages. First, it is possible that a sufficient number of data samples taken during the drawdown and beginning of the buildup cycles can be used by the control module 45 to generate curve fit and quality of fit values before the formation pressure is reached. In such a case, and if the curve fit quality meets a minimum criterion, the key data points and curve fit parameters can be transmitted to the surface where the curves are reconstructed. This process can be repeated until the buildup is terminated until the final hydrostatic pressure $P_{hyd2}$ is recorded and the curve is complete. Second, using this process, it is possible to determine the quality of the pressure test prior to completion. This enables the drill operator to terminate the test early or to extend the test based on real-time results. Hence, in this particular mode, the FTWD apparatus 30 can closely emulate a wireline formation tester.

Figure 6:
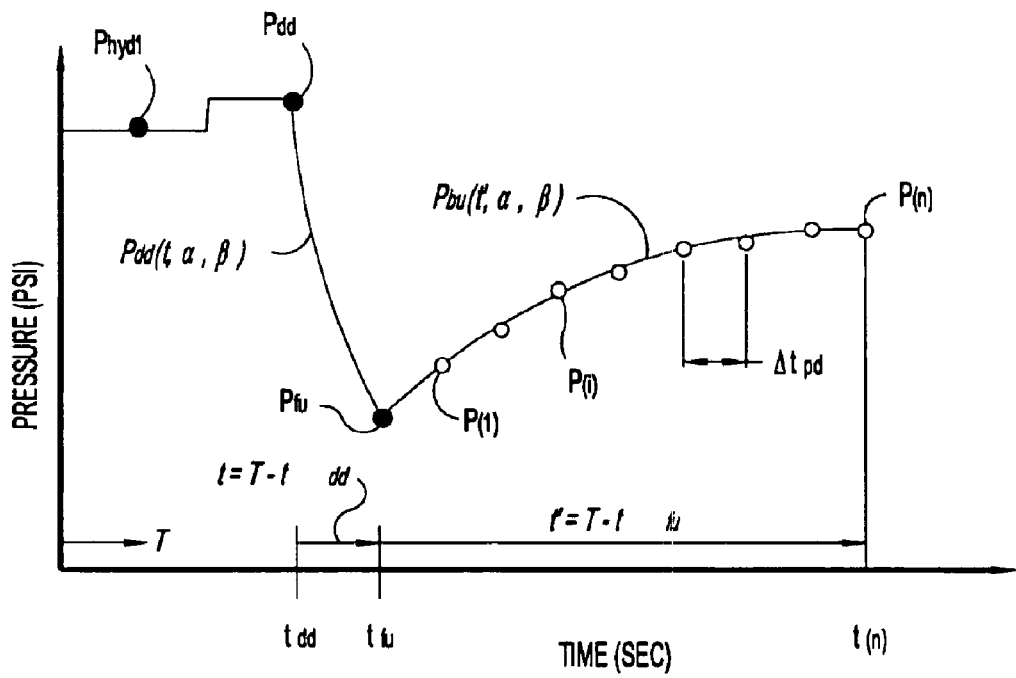
FIG. 6 shows a formation pressure test curve reflecting the critical time variables that are considered in generating the compressed formation test curve data.

In addition to the key data points discussed above and relevant curve fit parameters, the preferred embodiment relies on time variables to fully reconstruct the pressure curves at the surface once the data is received from the control module 45. These time variables are shown in FIG. 6 as $\Delta t_{hydr1}$, $\Delta t_{hydr2}$, $\Delta t_{set}$, and $\Delta t_{pd}$. $\Delta t_{hydr1}$ and $t_{hydr2}$ represent the initial and final hydrostatic wait times, respectively. $\Delta t_{set}$ represents the packer setting time, and $\Delta t_{pd}$ represents the pressure data time spacing. In general, each of the time variables are set to a default value at the surface and should correspond to time sequence settings within the FTWD apparatus 30. Whenever possible, data samples should be taken to coincide with control commands or events that initiate FTWD apparatus 30 functions. For example, when the FTWD apparatus is activated, the hydrostatic pressure can be measured after a set time period. Then, after the equalization valve is closed and the packer is extended, the tool is ready for the pretest or drawdown piston to be activated. Immediately before the piston is activated, the $P_{dd}$ and $t_{dd}$ values should be recorded. Further, the $P_{fu}$ and $t_{fu}$ values are preferably measured when the pretest piston stops moving. It may be the case that the pretest piston does not reach a final position so as to trigger a limit switch. In this case, $P_{fu}$ and $t_{fu}$ can simply be sampled after a fixed amount of time or based on the slope of the drawdown curve. Those skilled in the art will certainly recognize a variety of solutions for determining the proper termination of the drawdown and initiation of the buildup cycles.

Table 1 summarizes the events alluded to above and indicates suitable times when the critical data points and time variables should be selected. As indicated above, the control module 45 preferably receives data samples on a regular basis from the transducer 36. The control module stores these data points for use in generating curve fit parameters, but the events below should preferably be used to identify the critical data points, perhaps so the control module 45 can store the data points in a separate location in memory. Redundant copies of these data points may be made so that they can be used in calculating the curve fit parameters as well as transmitted to the surface once the formation test completes.

TABLE 1

Data Point Selection Tool Events

| Data | FTWD Apparatus Event | Description |
|---|---|---|
| $P_{dd}$ | Initiating a drawdown | Drawdown/set pressure (psi) |
| $P_{hyd1}$ | Start of test sequence | Initial hydrostatic pressure (psi) |
| $P_{fu}$ | At least 10 seconds after $t_{dd}$ or at closure of drawdown switch | Fillup pressure (psi) |
| $P_{stop}$ | Time, converge, equal valve closed | Stop pressure (psi) |
| $P_{hyd2}$ | End of test sequence | Final hydrostatic pressure (psi) |
| $t_{dd}$ | Start of drawdown | Drawdown time (sec) |
| $t_{fu}$ | End of drawdown | Fillup time (sec) |
| $t_{stop}$ | End of buildup | Open equalization valve (sec) |

In addition to the critical data points and time variables shown in Table 1, the preferred embodiment also generates curve fit parameters that permit reconstruction of the formation pressure curve from the minimal data point set and minimal time variables. These curve fit parameters $\alpha$, $\beta$ and $P_f$ are generated according to the equation set provided in Appendix A. Formation properties can also be determined using $\alpha$ and $\beta$. Parameter $\beta$ can be used to determine mobility $k_f/\mu$. Formation permeability $k_f$ can be estimated using an estimated filtrate viscosity $\mu$. Fluid compressibility $c_f$ can also be calculated. The equation set shown in Appendix A offers a preferred solution based on a simplification of the exact solution equation set provided in Appendix B. If the exact solution shown in Appendix B is used, then additional regression parameters $\beta$, $c_d$, $S_d$, and $t_d$ are generated that are related to formation properties and allow for a better curve fit. Parameter $\beta$ can be used to determine spherical mobility $k_f/\mu$. Parameter $t_d$ can then be used to determine coupled compressibility porosity $c\phi$. Parameter $c_d$ can then be used to determine flowline fluid compressibility C. Also, skin damage $S_d$ can be determined from the exact solution, which is an indication of how the mud filtrate has changed the permeability near the wellbore. Additionally, if two or more probes are utilized by the testing tool, the formation anisotropy can be determined, which is the ratio of the vertical and horizontal permeabilities. The approximate solution found in Appendix A is suitable for a short drawdown test typical of open hole logging and in determining the formation pressure $P_f$, mobility/permeability and flowline fluid compressibility. Furthermore, the curve fit quality parameter $X^2$ is calculated using the equation set shown in Appendix C.

It should be recognized that the form of the equations used in the preferred embodiment provides but one solution to the problem described above. The teachings provided herein should be interpreted to encompass other variations that include the generation of a minimal data set that may be transmitted from a downhole FTWD apparatus 30 to the surface such that formation test curves can be regenerated from said data set and analyzed for the quality of the data set.

Data from the downhole FTWD apparatus and the control module 45 is preferably transmitted in packets with the data types shown in Table 2. Those skilled in the art of communications will recognize that a data packet must contain a minimal amount of information in the packet header identifying the data included therein. The exact structure of the packet and choice of transmission protocol is dependent on the telemetry system used and relates to the preferred embodiment only inasmuch as the data should be properly identified and recognized as formation test data.

TABLE 2

Data Transmission Specifications

| Data | Type | Resolution | Range | Word Size |
|---|---|---|---|---|
| $P_{hydr1}$ | Integer | 6 psi | 0–25,000 psi | 12 |
| $P_{dd}$ | Integer | 6 psi | 0–25,000 psi | 12 |
| $P_{fu}$ | Integer | 6 psi | 0–25,000 psi | 12 |
| $P_{stop}$ | Integer | 1 psi | 0–25,000 psi | 16 |
| $P_{hydr2}$ | Integer | 6 psi | 0–25,000 psi | 12 |
| $\Delta t_{dd}$ | Integer | 1 sec | 0–16 seconds | 4 |
| $\Delta t_{bu}$ | Integer | 1 sec | 0–255 seconds | 8 |
| $\alpha$ | Integer | 0.5 s | 0–127 seconds | 8 |
| $\beta$ | Integer | 1 psi | 0–5355 psi | 8 |
| $P_f$ | Integer | 1 psi | 0–25,000 psi | 16 |
| $X^2$ | Integer | 1/16 | 0–16 | 8 |
| $P(i)$ | Integer | 6 psi | 0–25,000 psi | 12 |

In accordance with the preferred embodiment, the minimal five-point data set, the two time variables and four curve fit parameters, with the bit resolution and ranges shown in Table 2 are combined to form a 116-bit data set. Obviously, the size of the packet in which this data is transmitted will be nominally larger, but at a two bits/second transmission rate, the minimal data set can be transmitted uplink in just over 58 seconds. This minimal data set does not include any additional P(i) data points. To illustrate the extra time required to transmit the extra data points, an extra five points, for example, requires an extra 60 bits to be transmitted uplink. Using the same two bits/second standard, the additional data points will require at least an extra 30 seconds to upload. Without the curve fitting technique described herein, many additional P(i) data points would be required to adequately describe the range of typical formation test curves. Thus, it is apparent that the time and bandwidth savings afforded by the preferred embodiment is substantial given than a typical formation test curve can have hundreds of pressure samples that must be transmitted if not otherwise compressed as described herein. The transmission time can be further reduced if, instead of sending $P_{dd}$, $P_{fu}$, $P_{hydr2}$, $P_f$ and $P_{(i)}$ only, differences $\Delta P_{dd}$, $\Delta P_{fu}$, $\Delta_{hydr2}$, $\Delta P_f$ and $\Delta P_{(i)}$ are sent, where $\Delta P_{dd}=P_{dd}-P_{hydr1}$, $\Delta P_{fu}=P_{hydr1}-P_{fu}$, $\Delta P_{hydr2}=P_{hydr1}-P_{hydr2}$, $\Delta P_f=P_{stop}-P_f$ and $\Delta P_{(i)}=P^{(i)}-P_{fu}$. The new data types and bits saved are shown in Table 3.

TABLE 3

Modified Data Transmission Specifications

| Data | Type | Resolution | Range | Word Size | Bits saved |
|---|---|---|---|---|---|
| $\Delta P_{dd}$ | Integer | 8 psi | 0–2,040 psi | 8 | 4 |
| $\Delta P_{fu}$ | Integer | 8 psi | 0–8,184 psi | 10 | 2 |
| $\Delta P_{hydr2}$ | Integer | 8 psi | 0–2,040 psi | 8 | 4 |
| $\Delta P_f$ | Integer | 1 psi | 0–255 psi | 8 | 8 |
| $\Delta P_{(i)}$ | Integer | 6 psi | 0–2,040 psi | 8 | 4 |

Referring again to FIG. 6, once the minimal data set is transmitted to the surface, the formation pressure test curve may be reconstructed by plotting a horizontal hydrostatic pressure line representing $P_{hydr1}$ for the initial hydrostatic wait time $\Delta t_{hydr1}$. At the end of $\Delta t_{hydr1}$, a vertical line is plotted from $P_{hydr1}$ to $P_{dd}$. Again, a horizontal line is plotted for the duration of $\Delta t_{set}$ and ending with the $P_{dd}$ pressure point at $t_{dd}$. The time varying plots for $P_{dd}(t)$ and $P_{bu}(t)$ are then drawn according to the equations shown in Appendix A. $P_{dd}(t)$ is plotted with t beginning at 0 (starting at $t_{dd}$) and ending at $t_{fu}$ ($\Delta t_{dd}$ total). Similarly, $P_{bu}(t)$ is plotted with t' beginning at 0 (starting at $t_{fu}$) and ending at $t_{stop}$ ($\Delta t_{bu}$ total). Next, a vertical line is plotted at $t_{stop}$ from $P_{stop}$ to $P_{hydr2}$. Lastly, a horizontal line is plotted for the duration of $\Delta t_{hydr2}$.

Accordingly, the above-described embodiments disclose a compression scheme that reduces the amount of data that must be transmitted uplink from a FTWD apparatus. The preferred embodiment permits the reconstruction of formation pressure test curves using a minimal amount of data, time variables and curve fit parameters. The above discussion is meant to be illustrative of the principles and various embodiments of the present invention. Numerous variations and modifications will become apparent to those skilled in the art once the above disclosure is fully appreciated. For example, whereas the preferred curve fit parameters are based on logarithmic decay functions, other time varying functions may also be used. For instance, decay functions based on natural logarithms or other bases might be implemented. Furthermore, whereas the curve fit quality value is provided as a Chi-squared function, other error functions that provide a bounded quantitative value representing the quality of the curve fit might also be used. While a preferred embodiment of the invention has been shown and described, modifications thereof can be made by one skilled in the art without departing from the spirit of the invention. It is intended that the following claims be interpreted to embrace all such variations and modifications.

APPENDIX A

CURVE FIT PARAMETER EQUATIONS

Drawdown pressure formula:

$$\Delta P_{dd}(t) = P_f - P_{dd}(t) = 14,696 \frac{\mu}{k_f} \frac{Q_o}{2\pi} \frac{r_p}{r_p}\left(1 - e^{\frac{-t}{\alpha}}\right) \quad \text{(A-1)}$$

Exponential time constant:

$$\alpha = 14,696 \frac{\mu}{k_f} \frac{c_f V_s}{4\pi}\left(\frac{r_p}{r_p}\right) \quad \text{(A-2)}$$

APPENDIX A-continued

CURVE FIT PARAMETER EQUATIONS

For the buildup, superposition is used to determine this transient equation:

$$\Delta P_{bu}(t) = \Delta P_{dd}(t) - \Delta P_{dd}(t - \Delta t) \tag{A-3}$$

Where $\Delta t$ is the drawdown time. Now simplifying the equation becomes:

$$\Delta P_{bu}(t) = P_f - P_{bu}(t) = 14{,}696 \frac{\mu}{k_f} \frac{Q_o}{2\pi} \frac{\tau_p}{r_p}\left(e^{\frac{\Delta t}{\alpha}} - 1\right)e^{\frac{-t}{\alpha}} \tag{A-4}$$

It is more convenient to use a time scale where $t' = t - \Delta t$. In this case Eq. A-4 can be expressed as:

$$\Delta P_{bu}(t) = P_f - P_{bu}(t) = 14{,}696 \frac{\mu}{k_f} \frac{Q_o}{2\pi} \frac{\tau_p}{r_p}\left(1 - e^{\frac{-\Delta t}{\alpha}}\right)e^{\frac{-t'}{\alpha}} \tag{A-5}$$

Now the function can be simplified and expressed in terms of three unknowns, $\alpha$, $\beta$ and $P_f$.

$$\Delta P_{bu}(t) = P_f - P_{bu}(t) = \beta e^{\frac{-t'}{\alpha}} \tag{A-6}$$

Where a new constant is introduced:

$$\beta = 14{,}696 \frac{\mu}{k_f} \frac{Q_o}{2\pi} \frac{\tau_p}{r_p}\left(1 - e^{\frac{-\Delta t}{\alpha}}\right) \tag{A-7}$$

The drawdown function (Eq. A-1) can also be expressed in terms of the two parameters that characterize the transient pressure data.

$$\Delta P_{dd}(t) = P_f - P_{dd}(t) = \left(\frac{\beta}{1 - e^{\frac{-\Delta t}{\alpha}}}\right)\left(1 - e^{\frac{-t}{\alpha}}\right) \tag{A-8}$$

Because the drawdown transient is actually from the setting pressure $P_{dd}$, the transient is best simulated with the following modified function.

$$\Delta P_{dd}(t) = P_{dd} - P_{dd}(t) = \left(\frac{\beta + P_{dd} - P_f}{1 - e^{\frac{-\Delta t}{\alpha}}}\right)\left(1 - e^{\frac{-t}{\alpha}}\right) \tag{A-9}$$

These functions are a simpler version of the exact solution shown in the Appendix B (Ref. SPE 64650). The simpler function is suitable for the source probe of a short drawdown pressure test typical of open hole logging.
The input parametes for Eqs 7 and 9 are:

| | |
|---|---|
| $Q_o$ | drawdown flow rate (cc/sec) |
| $V_s$ | tool storage volume (cc) |
| $\tau_p$ | flow coefficient (1.37 default) |
| $r_p$ | probe radius (cm) |
| $\Delta t$ | production time ($t_{dd} - t_{fillup}$, sec) |
| T | test time (sec) |
| t | drawdown time ($t_{dd} - T$, sec) |
| t' | production time ($t_{fu} - T$, sec) |

The regression parameters are:

| | |
|---|---|
| $P_f$ | formation pressure (psi) |
| $\alpha$ | time constant (sec) |
| $\beta$ | pressure constant (psi) |

The following parameters can be derived from the regression and input parameters:
Formation Mobility (md/cp)

$$\frac{k_f}{\mu} = 14{,}696 \frac{1}{\beta} \frac{Q_o}{2\pi} \frac{\tau_p}{r_p}\left(1 - e^{\frac{-\Delta t}{\alpha}}\right) \tag{A-10}$$

Fluid Compressibility (1/psi):

$$c_f = \frac{\alpha}{14{,}696} \frac{k_f}{\mu} \frac{4\pi}{V_s}\left(\frac{r_p}{\tau_p}\right) \tag{A-11}$$

APPENDIX B

EXACT SOLUTION EQUATIONS

Exact Solution for Spherical Flow with Skin, Storage and Anisotropy:
This appendix contains the most general solution for probe type formation tester. The full development of this solution is contained in the SPE 64650 paper presented at the SPE International Oil and Gas Conference and Exhibition in China held in Beijing, China, Nov. 7–10, 2000. It has been demostrated that the simpler exponential solution is a subset of this exact solution in the SPE 39768 paper presented at the SPE Permian Basin Oil and Gas Recovery Conference held in Midland, Texas, Mar. 25–27, 1998.
The source probe pressure transient is determined by:

$$\Delta P_p(r_p, t) = \beta p_d(c_d, S_d, t_d) \tag{B-1}$$

where $$\beta = 14{,}696 \frac{\mu}{k_f} \frac{Q_o}{4\pi} \frac{r_s}{r_p} \tag{B-2}$$

$$p_d(c_d, S_d, t_d) = \frac{1+S_d}{S_d c_d} \sum_{n=1}^{3} \left\{ \frac{1}{y_n}\left(1 - \left(1 + \frac{x_n S_d}{1+S_d}\right) e^{x_n^2 t_d} \mathrm{erfc}\left(-x_n \sqrt{t_d}\right)\right)\right\} \tag{B-3}$$

The more general solution is presented in the following equation where $r_d$ is a dimensionless parameter that represents a location into the formation away from a source probe with the radius $r_p$.

$$p_d(r_d, t_d) = \frac{1}{S_d r_d c_d} \sum_{n=1}^{3} \left\{ \frac{1}{y_n}\left(\mathrm{erfc}\left(\frac{1-r_d}{2\sqrt{t_d}}\right) - e^{(-(1-r_d)x_n + x_n^2 t_d)} \mathrm{erfc}\left(\frac{1-r_d}{2\sqrt{t_d}} - x_n \sqrt{t_d}\right)\right)\right\} \tag{B-4}$$

$$y_1 = x_1(x_1 - x_2)(x_1 - x_3) \tag{B-5}$$
$$y_2 = x_2(x_2 - x_1)(x_2 - x_3) \tag{B-6}$$
$$y_3 = x_3(x_3 - x_1)(x_3 - x_2) \tag{B-7}$$

and the constants $x_1$, $x_2$ and $x_3$ are the roots of the cubic equation $$x^3 + \left(\frac{1+S_d}{S_d}\right)x^2 + \frac{x}{S_d c_d} + \frac{1}{S_d c_d} = 0 \tag{B-8}$$

The roots of the cubic equation (i.e., $x_n$) can have two complex conjugate terms. Because they are complex conjugates the "principle of reflection" proves that Eqs. B-2 and B-3 always evaluates to a real pressure.
Dimensionless constants:

$$r_d = \frac{r}{r_s} = \frac{\sqrt{k_f}}{r_s}\sqrt{\frac{x^2}{k_r} + \frac{y^2}{k_r} + \frac{z^2}{k_z}} \tag{B-9}$$

The dimensionless constant $r_d$ is used to determine how the pressure pulse from the source propagates into the formation. If a second probe is used to detect the pressure pulse then additional formation parameters can be determined such as permeability anisotropy ($k_z/k_r$). For the source probe $r_d$ is unity.
For a second probe located vertical from the source and located along the z axis where $x = 0$, $y = 0$ and the dimensionless $r_d$ can determined using Eq. B-8:

$$r_s = \frac{1}{2}\frac{r_p}{r_p} \tag{B-10}$$

$$r_{dz} = \frac{r}{r_s} = \frac{z}{r_s}\sqrt{\frac{k_f}{k_z}} = \frac{z}{r_s}\left(\frac{k_r}{k_z}\right)^{\frac{1}{3}} \tag{B-11}$$

$$t_d = \frac{t}{\phi c r_s^2}\frac{k_f}{\mu} \tag{B-12}$$

$$p_d = \left(\frac{4\pi r_s}{Q_o}\frac{k_f}{\mu}\right)(p(r,t) - P_o) \tag{B-13}$$

$$c_d = \frac{1}{4\pi}\frac{VC}{\phi r_s^3 c} \tag{B-14}$$

$$S_d = \frac{S}{\zeta} \tag{B-15}$$

$$\lambda = \frac{k_z}{k_r} \tag{B-16}$$

for $\lambda < 1$

APPENDIX B-continued

EXACT SOLUTION EQUATIONS $$\zeta = \frac{1}{\sqrt[3]{\lambda}} \left( \frac{1}{2} + \frac{\lambda}{4\sqrt{1-\lambda}} \ln\left( \frac{1+\sqrt{1-\lambda}}{1-\sqrt{1-\lambda}} \right) \right) \quad \text{(B-17)}$$

for $\lambda > 1$ $$\zeta = \frac{1}{\sqrt[3]{\lambda}} \left( \frac{1}{2} + \frac{\sqrt{\lambda} \arcsin(\sqrt{1-1/\lambda})}{2\sqrt{1-1/\lambda}} \right) \quad \text{(B-18)}$$

APPENDIX C

QUALITY ($X^2$) REGRESSION TECHNIQUE

A regression can be performed at time intervals that are within the capabilities of the downhole processor. For example a regression might be performed every 30 seconds.

Test Parameters:
$X^2_{min}$ = minimum Chi-squared
$\Delta P_{min}$ = minimum pressure drop 1. Check data picks and set anomalies to logical values.
   if $P_{stop} > P_{hyd1}$ then $P_{stop} = P_{hyd1}$
   if $P_{fu} > P_{stop}$ then $P_{fu} = P_{stop} - \Delta P_{min}$
   if $P_{dd} < P_{stop}$ then $P_{dd} = P_{stop}$
2. Initialize variables using the following assumptions.
   $P_f = P_{stop}$
   $\beta = P_f - P_{fu}$
3. While $\beta * 0.9 > \Delta P_{bu} = P_f - P_{data}(i) > 0.1 * \beta$ $$\alpha = \frac{1}{n} \sum_{i=1}^{n} \frac{-t'(i)}{\ln\left(\frac{P_{stop} - P_{data}(i)}{\beta}\right)}$$

4. Calculated Chi-square using Eq. A-6

$$X^2\{P_{bu}\} = \frac{1}{n-1} \sum_{i}^{n} \frac{(P_{data}(i) - P_{bu}(i))^2}{(P_{bu}(i))^2}$$

Where:

$$P_{bu}(i) = P_f - \beta e^{\frac{-t'(i)}{\alpha}}$$

5. If Chi-square $X^2\{P_{bu}\} > X^2_{min}$ then continue to vary $\alpha$, $\beta$ and $P_f$ until $X^2\{P_{bu}\} \leq X^2_{min}$
6. End regression When the regression history match of the most recently recorded data sequence demonstrates that the measured $P_{stop}$ is within 1 psi of the buildup function $P_{bu}$ (Eq. A-6 of Appendix A) the test can be terminated.

What is claimed is:

1. A method for compressing data gathered in a wellbore, the method comprising:
   acquiring a plurality of wellbore values;
   performing a curve fit analysis to the wellbore values;
   determining the value of at least one curve fit parameter from the curve fit analysis;
   and transmitting using at least one of mud pulse telemetry, sonic telemetry, and EM telemetry the at least one curve fit parameter.

2. The method of claim 1:
   wherein acquiring a plurality of wellbore values comprises acquiring at least one of wellbore values and formation values.

3. The method of claim 1 further comprising:
   comparing the curve fit analysis to the wellbore values.

4. The method of claim 3 further comprising generating a quality parameter to indicate the quality of the wellbore values.

5. The method of claim 4 further comprising:
   transmitting at least one of the, at least one curve fit parameter, the quality parameter, and a predetermined number of the wellbore values wherein the predetermined number of the wellbore values is less than the plurality of wellbore values.

6. The method of claim 5 further comprising:
   creating a data curve at the surface of the wellbore based on the at least one of the curve fit parameter, the quality parameter, and the predetermined number of the wellbore values.

7. The method of claim 1 wherein acquiring a plurality of wellbore values comprises at least one of pressure drawdown values and pressure buildup values.

8. The method of claim 1 wherein determining the value of at least one curve fit parameter from the curve fit analysis comprises determining quality of the plurality of wellbore values.

9. The method of claim 1 wherein determining the value of at least one curve fit parameter from the curve fit analysis further comprises:
   determining if one or more of the plurality of wellbore values is any one of substantially constant, and converged to a particular value; and
   terminating further acquisition of the plurality of wellbore values based upon the determination.

10. The method of claim 2 further comprising calculating at least one formation property using the at least one curve fit parameter.

11. The method of claim 3 further comprising generating a quality parameter to indicate the quality of the at least one curve fit parameter.

12. The method of claim 1 wherein the curve fit analysis comprises a time varying function.

13. The method of claim 12 wherein the time varying function comprises a logarithmic decay function.

14. The method of claim 12 wherein the time varying function comprises a natural logarithmic decay function.

15. The method of claim 5 further comprising:
   calculating at least one differential value based on the plurality of wellbore values; and
   wherein the predetermined number of wellbore values includes the at least one differential value.

16. The method of claim 3 further comprising generating a quality parameter to indicate the quality of a formation property derived from the at least one curve fit parameter.

17. A method of compressing pressure data gathered in a formation wellbore, the method comprising:
  acquiring a plurality of pressure values;
  generating at least one pressure curve from the pressure values;
  expressing one of the pressure curves in terms of a mathematical equation; and
  transmitting a quantity of information substantially less than the quantity of information from the previous steps.

18. The method of claim 17 wherein the pressure curve comprises a drawdown pressure curve $P_{dd}(t)$ according to the following mathematical equation:

$$P_{dd}(t) = P_{dd} - \left(\frac{\beta + P_{dd} - P_f}{1 - e^{\frac{-\Delta t}{\alpha}}}\right)\left(1 - e^{\frac{-t}{\alpha}}\right),$$

wherein t is time and $\alpha$, $\beta$ and $P_f$ are curve fit parameters and $P_{dd}$ is the pressure measured at the beginning of the drawdown.

19. The method of claim 18 wherein the curve fit parameters $\alpha$, $\beta$ and $P_f$ are defined by comparing the mathematical equation $P_{dd}(t)$ to the plurality of pressure values.

20. The method of claim 17 further comprising:
  (d) defining at least one curve fit parameter by comparing the mathematical equation to the plurality of pressure values.

21. The method of claim 20 further comprising:
  (e) measuring the correlation between the plurality of pressure values and the mathematical equation in terms of an error function.

22. The method of claim 21 wherein the step e) further comprises the sub-steps of:
  (i) approximating the solution of the mathematical equation using the curve fit parameters; and
  (ii) comparing the approximated solution to the plurality of pressure values.

23. The method of claim 22 wherein the error function comprises a chi-squared ($X^2$) value.

24. The method of claim 21 further comprising:
  (f) transmitting the at least one curve fit parameter, the error function, and a predetermined number of the pressure values to the surface of the wellbore, wherein the predetermined number of the pressure values is less than the plurality of pressure values; and
  (g) creating a pressure curve at the surface of the wellbore based on the at least one curve fit parameter, the error function, and the predetermined number of the pressure values.

25. The method of claim 17 wherein the pressure curve comprises a buildup pressure curve $P_{bu}(t)$ according to the following mathematical equation:

$$P_{bu}(t) = P_f - \beta e^{\frac{-t'}{\alpha}},$$

wherein t' is time and $\alpha$, $\beta$ and $P_f$ are curve fit parameters.

26. The method of claim 25 wherein the curve fit parameters $\alpha$, $\beta$ and $P_f$ are defined by comparing the mathematical equation $P_{bu}(t)$ to the plurality of pressure values.

27. The method of claim 17 wherein at least one of the pressure values is selected from the group consisting of $P_{hyd1}$, $P_{dd}$, $P_{fu}$, $P_{stop}$, and $P_{hyd2}$.

28. The method of claim 27 wherein at least five pressure values are acquired comprising $P_{hyd1}$, $P_{dd}$, $P_{fu}$, $P_{stop}$, and $P_{hyd2}$.

29. A control assembly for use in a formation test while drilling apparatus located in a wellbore, the control assembly comprising:
  a pressure sensor for detecting a quantity of formation pressure data;
  a control module coupled to the pressure sensor, the control module configured to reduce the quantity of data received from the pressure sensor and transmit the reduced quantity of pressure.

30. The control assembly of claim 29 wherein the control module further comprises:
  a memory device having embedded compression software code; and
  a processor configured to perform a curve fit analysis to the quantity of data using the software code.

31. The control assembly of claim 30 wherein the memory device is configured to store the quantity of formation pressure data.

32. The control assembly of claim 31 wherein the software code and formation pressure data are stored in separate memory devices.

33. The control assembly of claim 30 wherein the software code comprises:
  a first equation $$P_{dd}(t) = P_{dd} - \left(\frac{\beta + P_{dd} - P_f}{1 - e^{\frac{-\Delta t}{\alpha}}}\right)\left(1 - e^{\frac{-t}{\alpha}}\right),$$

wherein t is time and $\alpha$, $\beta$ and $P_f$ are curve fit parameters; and
  a second equation $$P_{bu}(t) = P_f - \beta e^{\frac{-t'}{\alpha}},$$

wherein t' is a second time value.

34. The control assembly of claim 33 wherein the curve fit analysis is configured to generate at least one set of curve fit parameters $\alpha$, $\beta$ and $P_f$ by comparing at least one of the equations $P_{dd}(t)$ and $P_{bp}(t)$ to the quantity of formation pressure data.

35. The control assembly of claim 34 wherein the processor is further configured to generate at least one correlation measurement by approximating a solution to at least one of the equations $P_{dd}(t)$ and $P_{bp}(t)$ using the generated curve fit parameters $\alpha$, $\beta$ and $P_f$ and comparing the at least one approximated solution to the quantity of formation pressure data.

36. A formation test while drilling apparatus for gathering formation pressure data and sending the data to the surface of a wellbore, the apparatus comprising:
  a longitudinal body configured to be coupled to a drill string;
  a formation testing assembly coupled to the body;
  a transmitter device coupled to the body;
  a pressure sensor for gathering a quantity of formation pressure data; and
  a control module comprising:
    a first memory device for storing software code;
    a second memory device for storing the quantity of formation pressure data; and
    a processor configured to use the software code to compress the quantity of pressure data transmitted to the surface of the wellbore.

37. The formation test while drilling apparatus of claim 36 wherein the quantity of formation pressure data can be represented by a plurality of pressure curves.

38. The formation test while drilling apparatus of claim 37 wherein the software code includes a curve fit analysis, and wherein the processor applies the curve fit analysis to the plurality of pressure curves.

39. The formation test while drilling apparatus of claim 38 wherein application of the curve fit analysis yields a plurality of curve fit parameters and an error function.

40. The formation test while drilling apparatus of claim 39 wherein the transmitter device transmits the plurality of curve fit parameters, the error function, and a predetermined number of the pressure data values to the surface of the wellbore, wherein the predetermined number of the pressure data values is less than the quantity of formation pressure data.

41. A method of compressing pressure data gathered in a formation wellbore, the method comprising:

(a) acquiring a plurality of pressure values;

(b) generating a drawdown pressure curve and a buildup pressure curve from the pressure values;

(c) expressing the drawdown pressure curve in terms of the following mathematical equation:

$$P_{bu}(t) = P_f - \beta e^{\frac{-t'}{\alpha}},$$

wherein t is time and $\alpha$, $\beta$ and $P_f$ are curve fit parameters and $P_{dd}$ is the pressure measured at the beginning of the drawdown;

(d) expressing the buildup pressure curve in terms of the following mathematical equation:

$$P_{bu}(t) = P_f - \beta e^{\frac{-t'}{\alpha}},$$

wherein t' is a second time value;

(e) determining the value of at least one set of curve fit parameters $\alpha$, $\beta$ and $P_f$ by comparing the equations $P_{dd}(t)$ and $P_{bu}(t)$ to the plurality of pressure values;

(f) approximating the solution to at least one of the equations $P_{dd}(t)$ and $P_{bu}(t)$ using the set of curve fit parameters;

(g) determining at least one error function by comparing the approximated solution to the plurality of pressure values;

(h) transmitting the set of curve fit parameters, the error function, and a predetermined number of the pressure values to the surface of the wellbore, wherein the predetermined number of the pressure values is less than the plurality of pressure values; and (i) reconstructing the drawdown and buildup pressure curves at the surface of the wellbore based on the transmitted set of curve fit parameters, error function, and predetermined number of pressure values.

42. The method of claim 41 wherein the plurality of pressure values comprise $P_{hyd1}$, $P_{dd}$, $P_{fu}$, $P_{stop}$, $P_{hyd2}$, $P_f$, and P(i), wherein P(i) comprises a plurality of pressure measurements where i increases with time starting at i=1 at $T_{fu}$.

43. The method of claim 41 wherein the predetermined number of pressure values includes $P_{hyd1}$, $P_{dd}$, $P_{fu}$, $P_{stop}$, and $P_{hyd2}$.

44. The method of claim 42 further comprising:

calculating at least one differential value based on the plurality of pressure values; and wherein the predetermined number of pressure values includes the at least one differential value.

45. The method of claim 44 wherein the at least one differential value is selected from the group consisting of $\Delta P_{dd}$, $\Delta P_{fu}$, $\Delta P_{hyd2}$, $\Delta P_f$, and $\Delta P(i)$.

46. The method of claim 42 wherein step (a) further comprises comparing the last acquired pressure value P(i) to the pressure value $P_f$ and terminating step (a) if P(i) and $P_f$ differ by a small quantity.

47. The method of claim 46 wherein the small quantity comprises 1 p.s.i. or less.

48. The method of claim 41 further comprising calculating at least one formation property using at least one of the curve fit parameters $\alpha$ and $\beta$.

49. The method of claim 48 wherein the at least one formation property is selected from the group consisting of formation permeability ($k_f$), mobility ($k_f/\mu$), and fluid compressibility $c_f$.

50. The method of claim 41 further comprising providing at least one exact solution equation and determining the values of a set of regression parameters.

51. The method of claim 50 wherein the set of regression parameters comprises $\beta$, $c_d$, $S_d$ and $t_d$.

52. The method according to claim 51 further comprising calculating at least one formation property using at least one of the regression parameters.

53. The method of claim 52 wherein the at least one formation property is selected from the group consisting of spherical mobility ($k_f/\mu$), coupled compressibility porosity ($c\phi$), flowline fluid compressibility (C), anisotropy ($k_v/k_h$), and skin damage $S_d$.

* * * * *